US011156906B2

(12) United States Patent
Wu et al.

(10) Patent No.: US 11,156,906 B2
(45) Date of Patent: Oct. 26, 2021

(54) PROJECTOR WITH AIR INLETS TO COOL LIGHT EMITTING MODULE

(71) Applicant: Coretronic Corporation, Hsin-Chu (TW)

(72) Inventors: Chih-Sheng Wu, Hsin-Chu (TW); Te-Tang Chen, Hsin-Chu (TW); Tsung-Ching Lin, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 83 days.

(21) Appl. No.: 16/721,937

(22) Filed: Dec. 20, 2019

(65) Prior Publication Data
US 2020/0201151 A1    Jun. 25, 2020

(30) Foreign Application Priority Data
Dec. 24, 2018    (CN) .......................... 201811579756.0

(51) Int. Cl.
*G03B 21/16*    (2006.01)
*G03B 21/14*    (2006.01)
*F21V 29/67*    (2015.01)

(52) U.S. Cl.
CPC .............. *G03B 21/16* (2013.01); *F21V 29/67* (2015.01); *G03B 21/145* (2013.01)

(58) Field of Classification Search
CPC ...... G03B 21/16; G03B 21/145; G03B 21/58; G03B 21/208; G03B 21/2013;
(Continued)

(56) References Cited

U.S. PATENT DOCUMENTS

| 2008/0055563 A1* | 3/2008 | Momose | G03B 21/16 353/61 |
| 2010/0066982 A1* | 3/2010 | Hsieh | G03B 21/16 353/61 |

(Continued)

FOREIGN PATENT DOCUMENTS

| CN | 103713450 | 4/2014 |
| CN | 106444237 | 2/2017 |

(Continued)

OTHER PUBLICATIONS

"Office Action of China Counterpart Application", dated May 28, 2021, p. 1-p. 11.

*Primary Examiner* — Sultan Chowdhury
(74) *Attorney, Agent, or Firm* — JCIPRNET

(57) ABSTRACT

A projector comprises a casing, a projection lens module and a light emitting module. The casing comprises a first air inlet and an air outlet. The projection lens module is disposed in the casing and adjacent to the first air inlet. The light emitting module is disposed in the casing and adjacent to the air outlet. The casing comprises a rear cover. The rear cover comprises a second air inlet, the second air inlet corresponds to the light emitting module. A first airflow flows into the casing from the first air inlet to dissipate heat from the projection lens module and the light emitting module, and then flows out of the air outlet. A second airflow flows into the casing from the second air inlet to dissipate heat from the light emitting module, and then flows out of the air outlet.

17 Claims, 7 Drawing Sheets

(58) Field of Classification Search
CPC ..... G03B 21/2033; F21V 29/50; F21V 29/67; F21V 29/76; F21V 29/77; H04N 9/3141; H04N 9/3144; H04N 9/3161; H04N 9/3164
See application file for complete search history.

(56) References Cited

U.S. PATENT DOCUMENTS

| | | | |
|---|---|---|---|
| 2014/0211478 A1* | 7/2014 | Park | F21V 29/83 362/294 |
| 2017/0277027 A1 | 9/2017 | Fukuda | |
| 2018/0149953 A1* | 5/2018 | Nomoto | G03B 21/16 |
| 2018/0231878 A1* | 8/2018 | Lin | G03B 21/16 |

FOREIGN PATENT DOCUMENTS

| | | |
|---|---|---|
| CN | 107949258 | 4/2018 |
| WO | 9423449 | 10/1994 |
| WO | 9746068 | 12/1997 |

\* cited by examiner

PROJECTOR WITH AIR INLETS TO COOL LIGHT EMITTING MODULE

CROSS-REFERENCE TO RELATED APPLICATION

This application claims the priority benefit of China application serial no. 201811579756.0, filed on Dec. 24, 2018. The entirety of the above-mentioned patent application is hereby incorporated by reference herein and made a part of this specification.

BACKGROUND OF THE INVENTION

1. Field of the Invention

The present invention relates to a display device, and in particular, to a projector having a heat dissipation structure.

2. Description of Related Art

A projector is a display device for generating a large-sized picture. The imaging principle is to convert an illumination beam provided by a light emitting module into an image beam by a light valve, and then to project the image beam to a screen through a projection lens to form an image. A user can use the projector and the projection screen to cooperate with image information provided by an image source for image presentation. Therefore, the projector plays a very large role in the transmission of information, and is widely used in many fields.

During operation of the projector, internal components of the projector, such as a projection lens module or a light emitting module, can generate heat. If heat is accumulated in a casing, the imaging quality of the projection lens can be affected. Therefore, the conventional method generally includes: arranging the projection lens module on the upstream side of the overall structure of the projector, i.e., an air inlet of the casing, and arranging the light emitting module and other components including a heat dissipation module such as a fin group or a fan on the downstream side of the overall structure, i.e., an air outlet of the casing, in order to maintain the imaging quality of the projection lens module without being affected by high temperature. However, in such an arrangement, the light emitting module as a main heat source can only dissipate heat through an airflow that has passed through the projection lens module and the light emitting module, resulting in bad efficiency of heat exchange between a heat dissipation module for cooling the light emitting module and the airflow that has passed through the projection lens module and the light emitting module, so that the heat dissipation problem of the light emitting module cannot be effectively resolved, the heat of the light emitting module cannot be effectively taken out of a system, and the efficiency of the light emitting module cannot be effectively improved.

In addition, a laser module applied to the light emitting module has brought about a smaller package and higher power under the continuous advancement of technology. With the existing known technology, the laser module is advanced to a newer generation, and a lower temperature and a higher power output are required, but the following problems are faced.

In the prior art, a mode of suppressing temperature rise only by increasing the fan speed to increase an air flow rate can cause high noise, the fin width of a heat sink is large, the path of an air flow is lengthened, and a boundary layer between fins grows larger, which increases the flow resistance and reduces the fan performance. Therefore, even if the airflow rate can be increased by the fan speed, the efficiency of increase is limited, thus causing inefficient heat dissipation of the heat sink.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The present invention provides a projector having a good heat dissipation effect and imaging quality.

In order to achieve one, some, or all of the aforementioned objectives or other objectives, an embodiment of the present invention provides a projector, which includes a casing, a projection lens module and a light emitting module. The casing includes a first air inlet and an air outlet. The projection lens module is disposed in the casing and adjacent to the first air inlet. The light emitting module is disposed in the casing and adjacent to the air outlet. The casing includes a rear cover. The rear cover includes a second air inlet, and the second air inlet corresponds to the light emitting module. A first airflow flows into the casing from the first air inlet to dissipate heat from the projection lens module and the light emitting module, and then flows out of the air outlet. A second airflow flows into the casing from the second air inlet to dissipate heat from the light emitting module, and then flows out of the air outlet.

Based on the foregoing, the projector of the present invention includes a casing, a projection lens module and a light emitting module, wherein the projection lens module is disposed in the casing and adjacent to a first air inlet of the casing, and the light emitting module is disposed in the casing and adjacent to an air outlet of the casing. In this way, a first airflow flows into the casing from the first air inlet to dissipate heat from the projection lens module and the light emitting module. In addition, a rear cover of the casing includes a second air inlet, and the second air inlet corresponds to the light emitting module. In this way, a second airflow flows into the casing from the second air inlet to dissipate heat from the light emitting module. Thus, in addition to introducing the first airflow through the first air inlet, the second airflow is further introduced for the light emitting module as a main heat source and a light emitting element of the light emitting module through the second air inlet to improve the heat dissipation effect of the light emitting module, so as to avoid impact on the luminous efficiency of the light emitting module caused by that the heat of the light emitting module cannot be effectively taken out. Accordingly, the projector of the present invention has a good heat dissipation effect and imaging quality. In addition, the impact on the imaging quality of the projection lens module caused by accumulation of heat in the casing may also be alleviated.

In order to make the aforementioned and other objectives and advantages of the present invention comprehensible, embodiments accompanied with figures are described in detail below.

Other objectives, features and advantages of the present invention can be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions can be regarded as illustrative in nature and not as restrictive.

Figure 1:
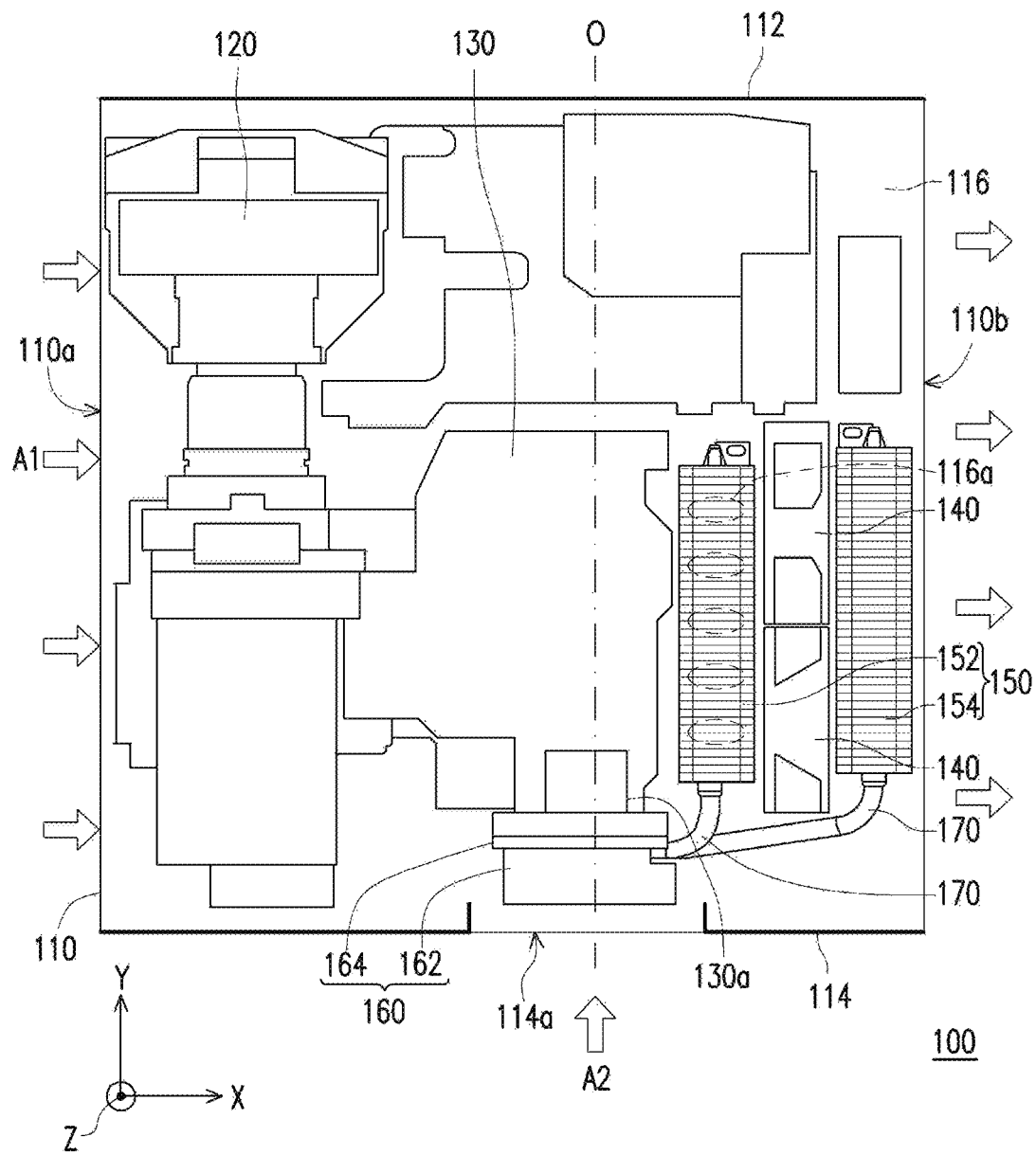
FIG. 1 is a schematic cross-sectional top view of a projector according to an embodiment of the present invention.

FIG. 1 is a schematic cross-sectional top view of a projector according to an embodiment of the present invention. Referring to FIG. 1, in the present embodiment, the projector 100 includes a casing 110, a projection lens module 120 and a light emitting module 130. The projection lens module 120 and the light emitting module 130 are disposed in the casing 110. The light emitting module 130 includes a light emitting element 130a, a light valve, other optical components (for example, a reflecting mirror, a collecting lens, etc.), and other components not shown. In the present embodiment, the light emitting element 130a is, for example, a solid-state light source including a laser diode or a light emitting diode (LED) for providing an excitation light beam. In other embodiments, the light emitting element 130a is, for example, a bulb, and is not limited thereto. The light emitting module 130 is adapted to provide an illumination beam. The light valve is disposed on a transmission path of the illumination beam to convert the illumination beam into an image beam. Subsequently, the projection lens module 120 is disposed on a transmission path of the image beam to convert the image beam into a projection beam, thereby causing the projector 100 to achieve a projection action. However, the above description is only an embodiment of the projector 100, the projection lens module 120 and the light emitting module 130. The composition of the projector 100 and the composition of the projection lens module 120 and the light emitting module 130 can be adjusted according to requirements, and the present invention is not limited thereto.

In the present embodiment, the casing 110 includes a front cover 112, a rear cover 114, a lower cover 116, and a pair of side covers and an upper cover not shown. The front cover 112 and the rear cover 114 are opposite to each other, the pair of side covers not shown are opposite to each other, and the lower cover 116 and the upper cover not shown are opposed to each other, so that the casing 110 is substantially in the shape of a box, and the remaining components can be disposed in the casing 110. FIG. 1 can be regarded as a schematic cross-sectional top view of the projector 100 after the upper cover of the casing 110 is removed. However, depending on an application mode, the casing 110 can be adjusted to a disc shape, an elliptical disc shape or other suitable shapes according to requirements, the size thereof can also be adjusted according to requirements, and the present invention is not limited thereto. The projection lens module 120 and the light emitting module 130 are disposed in the casing 110 to achieve the aforementioned projection action.

During operation of the projector 100, internal components of the projector 100, such as the projection lens module 120 and the light emitting module 130, can generate heat. In particular, the light emitting element 130a of the light emitting module 130 can be regarded as one of the main heat sources of the projector 100. If heat is accumulated in the casing 110, the heat dissipation effect of the light emitting module 130 and the imaging quality of the projection lens module 120 can be affected. Therefore, as shown in FIG. 1, in the present embodiment, the casing 110 includes a first air inlet 110a and an air outlet 110b. The first air inlet 110a and the air outlet 110b are, for example, disposed on the pair of side covers not shown, and are correspondingly disposed on two opposite sides of the casing 110. The projection lens module 120 and the light emitting module 130 are located between the first air inlet 110a and the air outlet 110b, wherein the projection lens module 120 is disposed in the casing 110 and adjacent to the first air inlet 110a. A projection beam projected by the projection lens module 120 exits the projector 100 through the upper cover. The front cover 112 is not provided with any openings.

The light emitting module 130 is disposed in the casing 110 and adjacent to the air outlet 110b. In this way, a first airflow A1 flows into the casing 110 from the first air inlet 110a to dissipate heat from the projection lens module 120 and the light emitting module 130, and then flows out of the air outlet 110b. The projection lens module 120 and the light emitting module 130 are located between the first air inlet 110a and the air outlet 110b on a flow path of the first airflow A1. Thus, heat generated by the internal components of the projector 100 can be dissipated through the first airflow A1. In particular, the projection lens module 120 is disposed close to the first air inlet 110a, heat can be effectively dissipated from the projection lens module 120 through the first airflow A1, and the imaging quality of the projection lens module 120 can be maintained.

In the present embodiment, the rear cover 114 of the casing 110 includes a second air inlet 114a. The second air inlet 114a corresponds to the light emitting element 130a of the light emitting module 130. Further, the second air inlet 114a is located at a rear end of the light emitting module 130, the air outlet 110b is located at a side end relative to the light emitting module 130, and the light emitting module 130 is located between the second air inlet 114a and the air outlet 110b on a flow path of a second airflow A2. In this way, the second airflow A2 flows into the casing 110 from the second air inlet 114a to dissipate heat from the light emitting element 130a of the light emitting module 130, and then flows out of the air outlet 110b. Thus, in addition to the first airflow A1, the heat generated by the light emitting module 130 of the projector 100 can be further dissipated through the second airflow A2. It is further illustrated that, in addition to the first airflow A1, the heat generated by the light emitting element 130a of the light emitting module 130 can be further dissipated through the second airflow A2.

Further, in the present embodiment, since the first air inlet 110a and the air outlet 110b are respectively disposed on the pair of side covers of the casing 110 and the second air inlet 114a is disposed on the rear cover 114 of the casing 110, the second air inlet 114a is closer to the air outlet 110b than the first air inlet 110a. In this way, the first airflow A1 can sequentially flow through the projection lens module 120 and the light emitting module 130, the second airflow A2 mainly flows through a heat dissipation module of the light emitting module 130, and the first airflow A1 and the second airflow A2 subsequently flow out of the air outlet 110b.

In the present embodiment, when the projector 100 is placed in an XYZ coordinate system, an optical axis O of the light emitting element 130a of the light emitting module 130 is substantially parallel to a Y axis of the XYZ coordinate system, and a central normal (not shown) of the second air inlet 114a is substantially parallel to the Y axis such that an angle between the optical axis O of the light emitting element 130a and the central normal of the second air inlet 114a is substantially 0 degree. That is, the optical axis O of the light emitting element 130a substantially coincides with the central normal of the second air inlet 114a. The term "substantially" means that the difference brought by manufacturing tolerances or dimensional designs is allowable. Therefore, an angle between the optical axis O of the light emitting element 130a and the central normal of the second air inlet 114a ranges from 0 to 5 degrees. That is, slight offset is allowed under the premise that the optical axis O of the light emitting element 130a and the central normal of the second air inlet 114a coincide with each other. However, the above conditions are only one of the embodiments of the present invention. In other embodiments, when the projector 100 employs another type of casing (for example, a rear cover having a curved profile), or even if a square box-shaped casing 110 is employed, but the position of the second air inlet 114a is adjusted, resulting in that the central normal of the second air inlet 114a is not parallel to the Y axis, the angle between the optical axis O of the light emitting element 130a and the central normal of the second air inlet 114a may also be adjusted according to requirements. The angle between the optical axis O of the light emitting element 130a and the central normal of the second air inlet 114a ranges from 0 to 45 degrees, but the present invention is not limited thereto. As long as the second air inlet 114a can cause the second airflow A2 to flow to the heat dissipation module of the light emitting module 130 to dissipate heat, the heat dissipation purpose of the present invention can be achieved, and the specific implementation can be adjusted according to requirements.

Similarly, when the projector 100 is placed in an XYZ coordinate system, a central normal of the second air inlet 114a is substantially parallel to a Y axis of the XYZ coordinate system, and a central normal (not shown) of the air outlet 110b is substantially parallel to an X axis such that an angle between the central normal of the second air inlet 114a and the central normal of the air outlet 110b is substantially 90 degree. That is, the central normal of the second air inlet 114a is substantially perpendicular to the central normal of the air outlet 110b. Therefore, the angle between the central normal of the second air inlet 114a and the central normal of the air outlet 110b ranges from 85 to 95 degrees. However, the above conditions are only one of the embodiments of the present invention. In other embodiments, when the projector 100 employs another type of casing (for example, a rear cover or side cover having a curved profile), or even if a square box-shaped casing 110 is employed, but the position(s) of the second air inlet 114a and/or the air outlet 110b are/is adjusted, resulting in that the central normal of the second air inlet 114a is not parallel to the Y axis and/or the central normal of the air outlet 110b are/is not parallel to the X axis, the angle between the central normal of the second air inlet 114a and the central normal of the air outlet 110b may also be adjusted according to requirements. The present invention is not limited thereto. As long as the second air inlet 114a can cause the second airflow A2 to flow to the light emitting module 130 to dissipate heat and the air outlet 110b can cause the second airflow A2 to flow out of the casing 110, the heat dissipation purpose of the present invention can be achieved, and the specific implementation can be adjusted according to requirements.

In addition, in order to improve the heat dissipation effect, the projector 100 further includes a heat dissipation module including a fan 140, a fin group 150, a heat dissipation base 160, and a heat tube 170. In the present embodiment, the fan 140 is disposed in the casing 110 and located between the light emitting module 130 and the air outlet 110b to draw the first airflow A1 and the second airflow A2 flowing into the casing 110 from the first air inlet 110a and the second air inlet 114a to the air outlet 110b. The fin group 150 is disposed in the casing 110 and located between the light emitting module 130 and the air outlet 110b, such that the first airflow A1 and the second airflow A2 drawn by the fan 140 flow through the fin group 150 to the air outlet 110b and are discharged to the projector 100. That is, the fan 140 and the fin group 150 are closer to the air outlet 110b than the light emitting module 130, so that the distance between the projection lens module 120 and the first air inlet 110a in an X-axis direction is less than the distance between the light emitting module 130 and the air outlet 110b in the X-axis direction. That is, the fan 140 and the fin group 150 are also provided between the light emitting module 130 and the air outlet 110b, but the present invention is not limited thereto, and can be adjusted according to requirements. In this way, the arrangement of the fan 140 and the fin group 150 can assist in guiding the heat in the casing 110 to the air outlet 110b, thereby further improving the overall heat dissipation effect of the projector 100.

Further, in order to improve the heat dissipation effect, in the present embodiment, the heat dissipation base 160 of the projector 100 is connected to the light emitting module 130. That is, the heat dissipation base 160 is in contact with the light emitting element 130a. Heat generated by the light emitting element 130a is transmitted to the heat dissipation base 160 by way of heat conduction, and the heat dissipation base 160 is located between the light emitting module 130 and the second air inlet 114a. The heat dissipation base 160 includes a plurality of heat dissipation structures 162 and a base 164 for connecting the light emitting module 130. The base 164 is, for example, a flat plate easily joined to the light emitting module 130. For example, the base 164 is joined to the rear side of the light emitting element 130a. The heat dissipation structures 162 protrude from the base 164 toward the second air inlet 114a and are spaced apart from each other. In this way, heat generated by the light emitting module 130 and the light emitting element 130a can be transmitted outward through the heat dissipation base 160, and is dissipated with the second airflow A2 flowing in from the second air inlet 114a, so that the heat flows out of the air outlet 110b along with the second airflow A2. Since the distance between the heat dissipation base 160 and the light emitting element 130a of the light emitting module 130 is short and the thermal resistance is low, heat can be efficiently transmitted from the light emitting module 130 to the heat dissipation base 160, so that there is a large temperature difference between the heat dissipation base 160 and the second airflow A2 flowing into the second air inlet 114a have a large temperature difference. Therefore, the efficiency of heat exchange between the heat dissipation base 160 and the second airflow A2 can be improved. Further, the heat tube 170 connects the heat dissipation base 160 and the fin group 150. In this way, heat generated by the light emitting module 130 can be transmitted to the fin group 150 through the heat dissipation base 160 and the heat tube 170, and is dissipated with the first airflow A1 flowing in from the first air inlet 110a and the second airflow A2 flowing in from the second air inlet 114a, so that the heat flows out of the air outlet 110b at the fin group 150 along with the first airflow A1 and the second airflow A2. In this way, the arrangement of the heat dissipation base 160 and the heat tube 170 can further improve the heat dissipation effect.

Figure 2A:
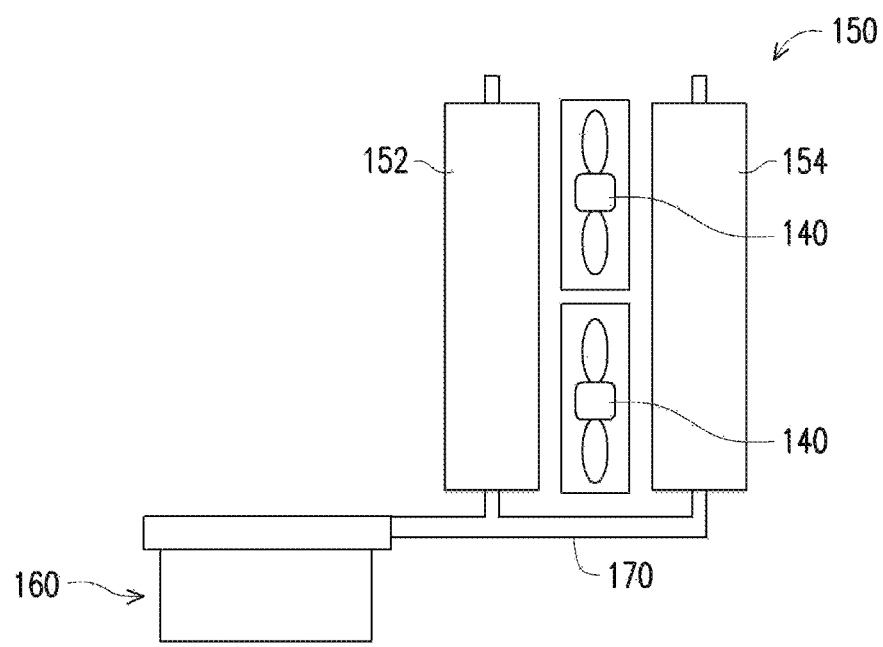
FIG. 2A is a schematic view of some components of the projector in FIG. 1.

FIG. 2A is a schematic view of some components of the projector in FIG. 1. FIG. 2B to FIG. 2E are schematic views of some components of other embodiments. FIG. 3A is a schematic view of a heat dissipation base in FIG. 1. FIG. 3B to FIG. 3D are schematic views of a heat dissipation base of other embodiments. The fans and the fin groups of the present embodiment and other embodiments can be described below with reference to FIG. 2A to FIG. 2E, and the heat dissipation bases of the present embodiment and other embodiments can be described with reference to FIG. 3A to FIG. 3D.

Referring to FIG. 1 and FIG. 2A, in the present embodiment, the number of fans 140 is two, the fans 140 are arranged side by side between the light emitting module 130 and the air outlet 110b, but one or more than three fans may be used, and the present invention is not limited thereto. Further, the fin group 150 includes an upstream fin group 152 and a downstream fin group 154. The upstream fin group 152 is disposed between the light emitting module 130 and the fan 140, and the downstream fin group 154 is disposed between the fan 140 and the air outlet 110b, such that the fan 140 is disposed between the upstream fin group 152 and the downstream fin group 154. The upstream fin group 152 and the downstream fin group 154 are each a combination of a plurality of fins, and the arrangement range of the fin group 150 (i.e., the upstream fin group 152 and the downstream fin group 154) corresponds to the arrangement range of two fans 140. That is, the distribution range of fins included in the fin group 150 in an axial direction (the Y axis of the XYZ coordinate system in FIG. 1) corresponds to the arrangement range of the fans 140 in the axial direction (the Y axis of the XYZ coordinate system in FIG. 1). That is, the upstream fin group 152, the downstream fin group 154 and the fan 140 are substantially the same in size (occupied volume). In this way, the first airflow A1 and the second airflow A2 can sequentially pass through the upstream fin group 152, the fan 140 and the downstream fin group 154, and then flow out of the air outlet 110b. The heat dissipation module of a sandwich structure formed by the upstream fin group 152, the fan 140 and the downstream fin group 154 can have a lower flow resistance and increase the air inflow, so as to improve the heat dissipation effect. However, the composition of the fan 140 and the fin group 150 may also be adjusted in a manner described in the embodiment of FIG. 2B to FIG. 2E.

Figure 2B:
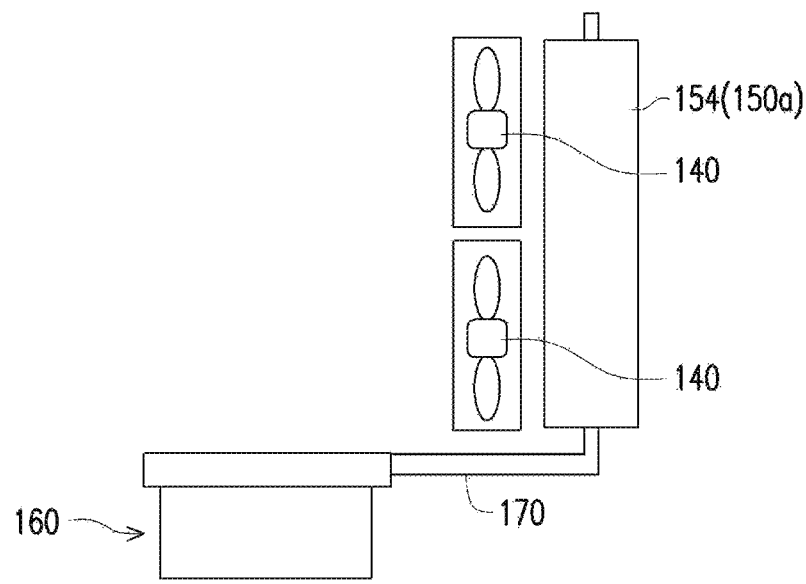
FIG. 2B to FIG. 2E are schematic views of some components of other embodiments.
Figure 2C:
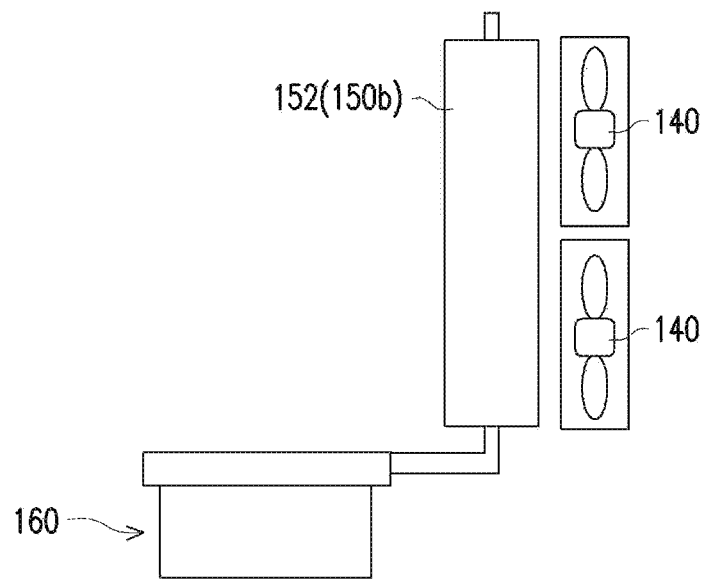
Figure 3A:
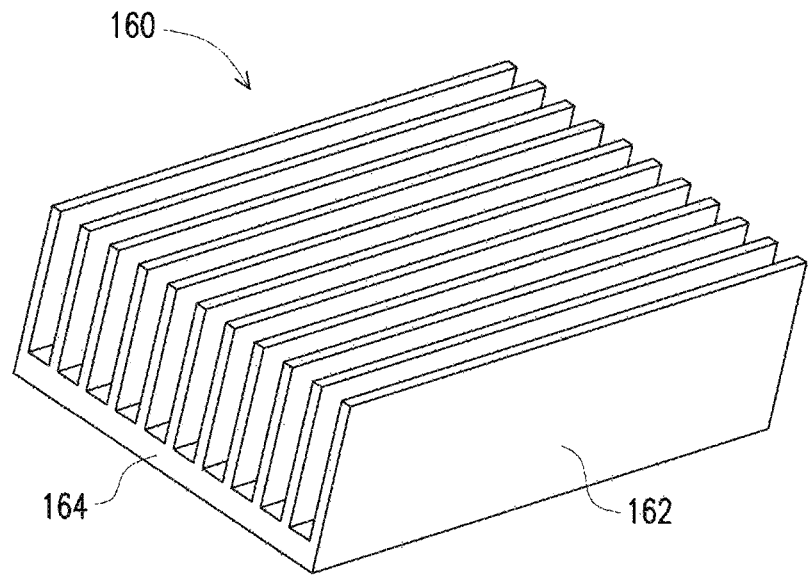
FIG. 3A is a schematic view of a heat dissipation base in FIG. 1.
Figure 3B:
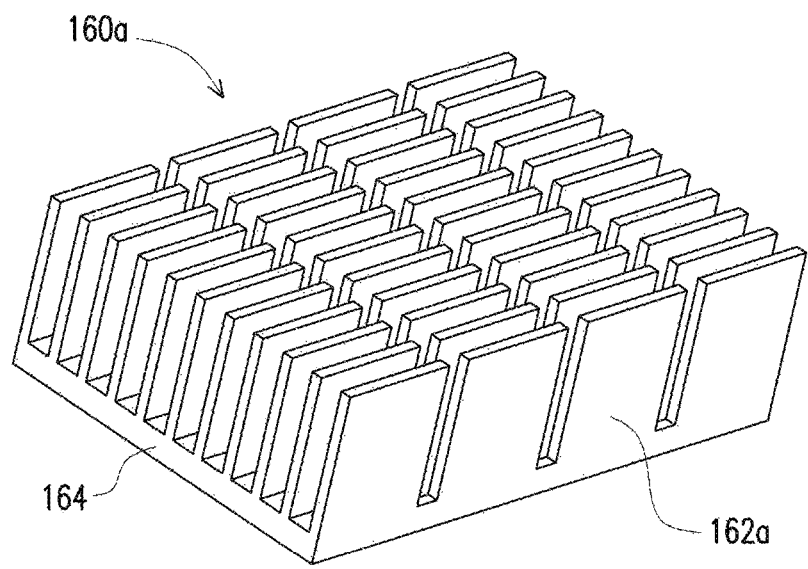
FIG. 3B to FIG. 3D are schematic views of a heat dissipation base of other embodiments.
Figure 3C:
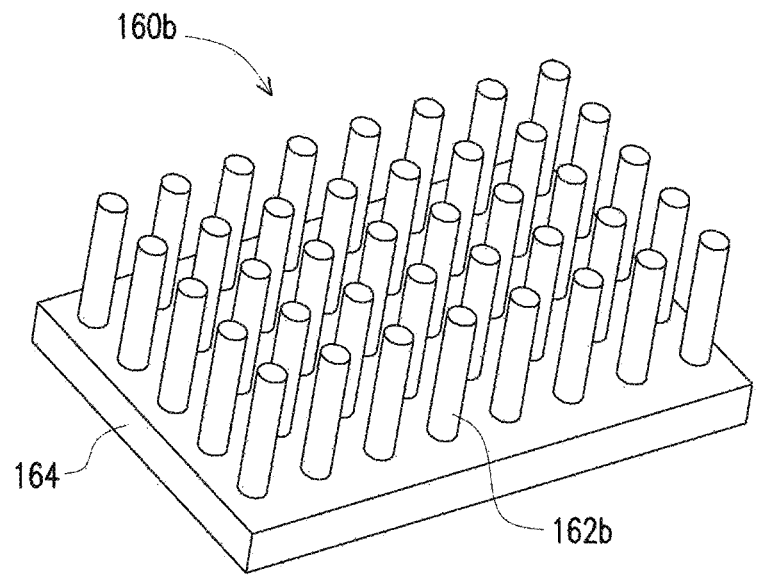
Figure 3D:
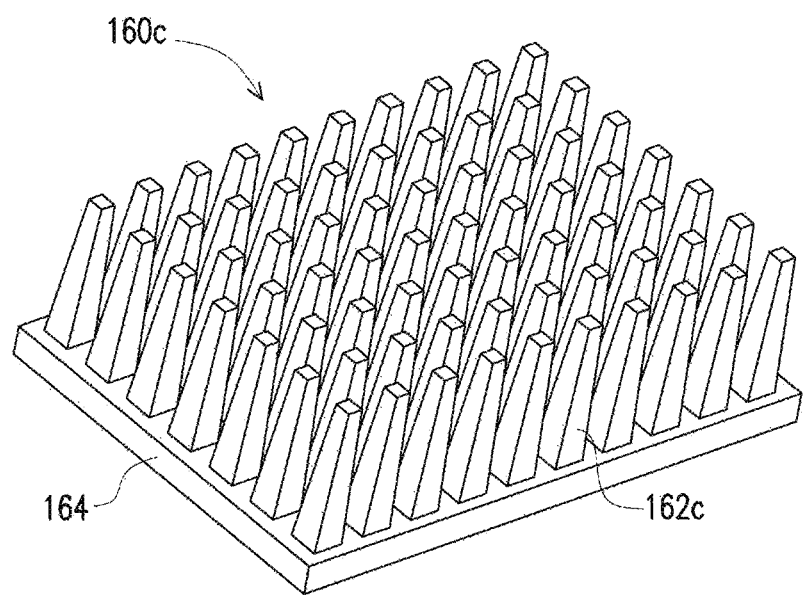

Specifically, in the embodiment of FIG. 2B, the fin group 150a includes the downstream fin group 154 but does not include the upstream fin group 152. In the embodiment of FIG. 2C, the fin group 150b includes the upstream fin group 152 but does not include the downstream fin group 154. When only one of the upstream fin group 152 and the downstream fin group 154 is used, only one set of heat tubes 170 is used to connect the light emitting module 130 and the upstream fin group 152 or the downstream fin group 154. It can be seen that the composition of the fin group can be adjusted according to requirements, and the present invention is not limited thereto. Moreover, although not illustrated, the size of the fin group can be adjusted according to requirements. When only one of the upstream fin group 152 and the downstream fin group 154 is used, wider fins may be used to form the upstream fin group 152 or the downstream fin group 154, and the present invention is not limited thereto.

Figure 2D:
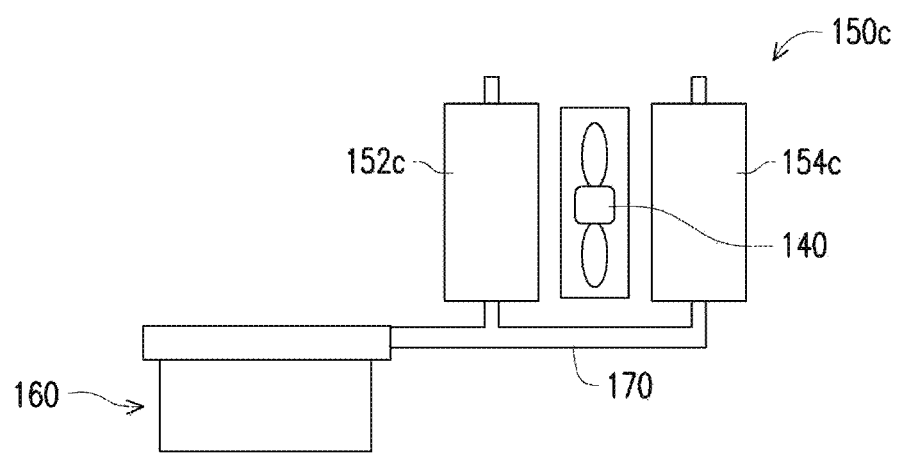
Figure 2E:
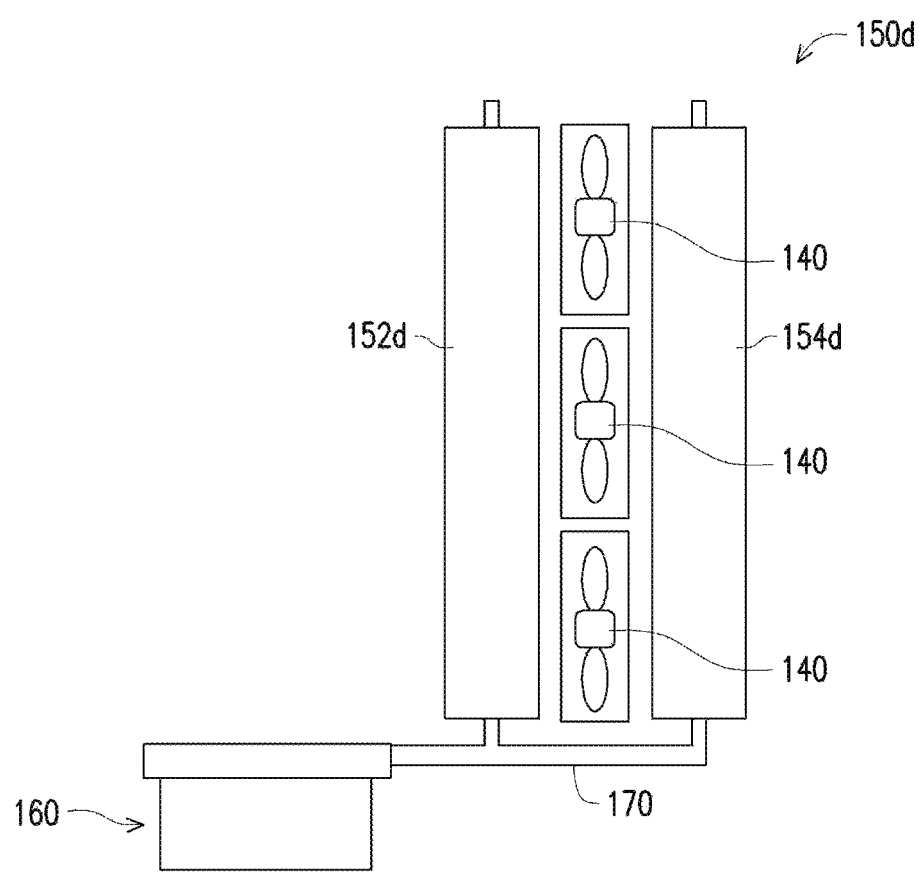

In addition, in the embodiment of FIG. 2D, there is one fan 140, and the arrangement range of a fin group 150c (including an upstream fin group 152c and a downstream fin group 154c) corresponds to the arrangement range of the one fan 140. Similarly, in the embodiment of FIG. 2E, there are three fans 140 arranged side by side, and the arrangement range of a fin group 150d (including an upstream fin group 152d and a downstream fin group 154d) corresponds to the arrangement range of the three fans 140. It can be seen that the number of the fans 140 can be adjusted according to requirements, the arrangement range of the fin group can be adjusted corresponding to the arrangement range of the fan 140, and the present invention is not limited thereto. Moreover, although not illustrated, when a plurality of fans 140 are used, the arrangement of the fans 140 can also be adjusted according to requirements, in this case, the fin group can also use only one of the upstream fin group and the downstream fin group, and the present invention is not limited thereto.

Further, referring to FIG. 1 and FIG. 3A, in the present embodiment, the heat dissipation base 160 includes a heat dissipation structure 162 and a flat base 164. The heat dissipation structure 162 is a plurality of fins that straddle the left and right sides of the base 164, protrude out from the base 164 to be arranged in parallel, and are spaced apart from each other. When the heat dissipation base 160 is disposed on the light emitting module 130 by the flat base 164, the fins as the heat dissipation structure 162 extend toward the second air inlet 114a and are substantially parallel to an XY plane of the XYZ coordinate system. Thus, the second airflow A2 can exchange heat with the heat dissipation structure 164 of the heat dissipation base 160, and the heat transmitted from the light emitting module 130 and the light emitting element 130a to the heat dissipation base 160 can flow out of the air outlet 110b along with the second airflow A2. Moreover, although not illustrated, the fins as the heat dissipation structure 162 may extend to the second air inlet 114a by other means, and the present invention is not limited thereto. However, the structure of the heat dissipation base 160 may also be adjusted in a manner described in the embodiments of FIG. 3B to FIG. 3D.

In the embodiment of FIG. 3B, the heat dissipation base 160a includes a heat dissipation structure 162a and a flat base 164. The heat dissipation structure 162a is fins that protrude out from the base 164 and are arranged in an array. When the heat dissipation base 160a is disposed on the light emitting module 130 by the flat base 164, the arrayed fins as the heat dissipation structure 162a extend toward the second air inlet 114a and are each substantially parallel to an XY plane of the XYZ coordinate system. Thus, a gap between the fins can be increased as compared with the embodiment of FIG. 3A, but the present invention is not limited thereto.

Similarly, in the embodiments of FIG. 3C and FIG. 3D, the heat dissipation base 160b includes a heat dissipation structure 162b and a flat base 164, and the heat dissipation base 160c includes a heat dissipation structure 162c and a flat base 164. The heat dissipation structure 162b is a plurality of heat dissipation columns that protrude out from the base 164, are arranged in an array and have a circular cross section and a uniform width in a height direction, and the heat dissipation structure 162c is a plurality of heat dissipation columns that protrude out from the base 164, are arranged in an array and have a rectangular cross section and a width decreasing in the height direction from the bottom to the top. When the heat dissipation base 160b or the heat dissipation base 160c is disposed on the light emitting module 130 by the flat base 164, the arrayed heat dissipation columns as the heat dissipation structure 162a or the heat dissipation structure 162b extend toward the second air inlet 114a. Therefore, the present invention does not limit the specific form of the heat dissipation structure used in the heat dissipation base, as long as the heat generated by the light emitting module 130 and the light emitting element 130a can be transmitted outward through the heat dissipation base.

Figure 4:
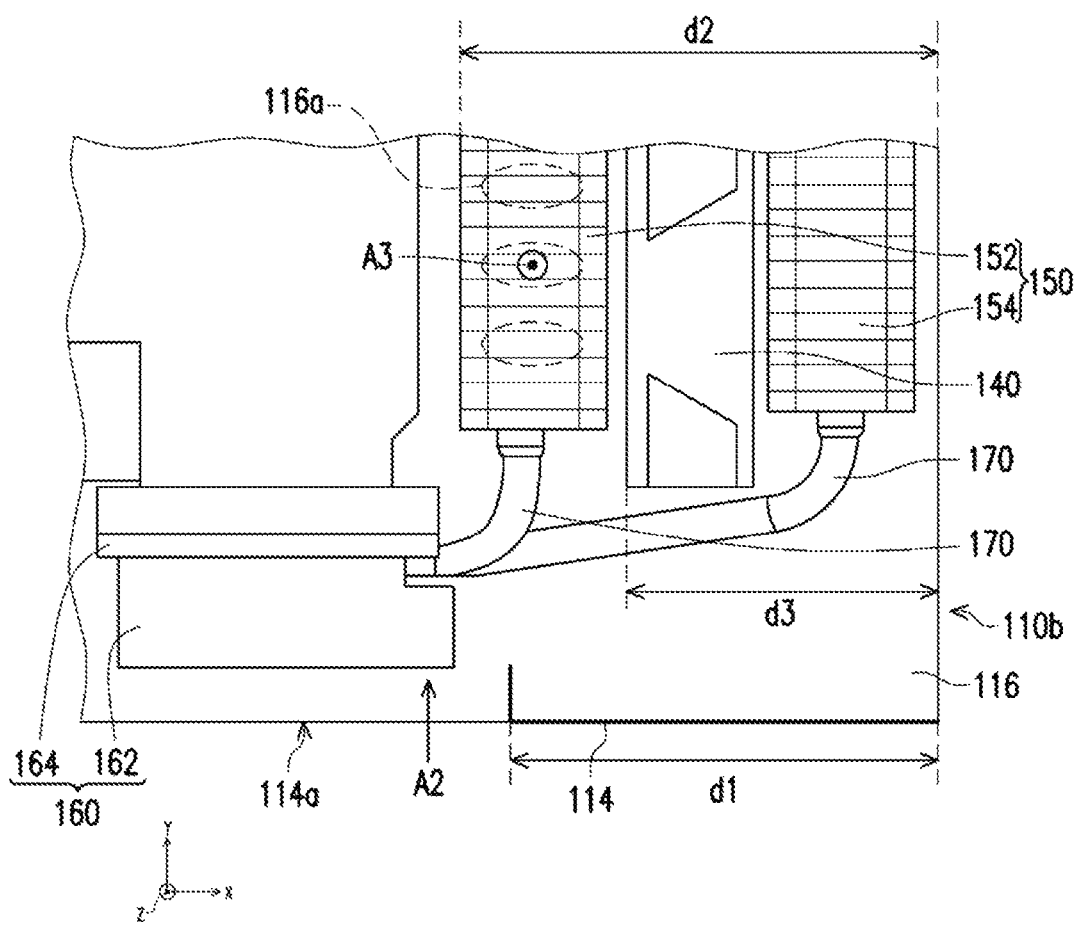
FIG. 4 is an enlarged partial cross-sectional top view of the projector in FIG. 1.

FIG. 4 is an enlarged partial cross-sectional top view of the projector in FIG. 1. Referring to FIG. 1 and FIG. 4, in the present embodiment, a distance d1 between an end of the second air inlet 114a closest to the air outlet 110b and the air outlet 110b is less than a distance d2 between a side of the fin group 150 farthest from the air outlet 110b (for example, the surface of the fin group 150 where an airflow first enters) and the air outlet 110b, and the distance d1 between the end of the second air inlet 114a closest to the air outlet 110b and the air outlet 110b is greater than a distance d3 between a side of the fan 140 farthest from the air outlet 110b and the air outlet 110b. The above design is used to improve the heat dissipation effect.

Specifically, the distance d1 between the end of the second air inlet 114a closest to the air outlet 110b and the air outlet 110b refers to a distance between the end of the second air inlet 114a closest to the air outlet 110b and the air outlet 110b along the X-axis direction of the XYZ coordinate axis, the distance d2 between the side of the fin group 150 away from the air outlet 110b and the air outlet 110b refers to a distance between a side of the upstream fin group 152 in the fin group 150 away from the air outlet 110b and the air outlet 110b along the X-axis direction, and the distance d3 between the side of the fan 140 away from the air outlet 110b and the air outlet 110b refers to a distance between the side of the fan 140 away from the air outlet 110b and the air outlet 110b along the X-axis direction. However, when other types of casings different from the casing 110 of FIG. 1 are used, it is not limited to the above definition.

In the present embodiment, the distance d1 is set to be less than the distance d2. That is, the opening range of the second air inlet 114a and the arrangement position of the fin group 150 partially overlap in the X-axis direction. Thus, the second airflow A2 entering the casing 110 from the second air inlet 114a at least corresponds to a portion of the fin group 150 (for example, the upstream fin group 152), so that heat can be fully exchanged between the second airflow A2 and the fin group 150, thereby improving the overall heat dissipation effect. Similarly, the distance d1 is set to be greater than the distance d3. That is, the opening range of the second air inlet 114a does not overlap with the arrangement position of the fan 140 in the X-axis direction, and in the X-axis direction, the second air inlet 114a is positioned in front of the fan 140, such that the fan 140 is located on the flow path of the second airflow A2 (i.e., the second airflow A2 flows through the second air inlet 114a and the fan 140 to the air outlet 110b). Thus, a portion of the second airflow A2 entering the casing 110 from the second air inlet 114a can be directly drawn by the fan 140 and fully exchanges heat with a portion of the first airflow A1 flowing through the upstream fin group 152. The so-called heat exchange is that the high-temperature first airflow A1 is sufficiently mixed with a portion of the second airflow A2 directly entering the casing 110 to lower the temperature of the airflows, so that a portion of the first airflow A1 and a portion of the second airflow A2 flowing out of the fan 140 have a lower temperature, the downstream fin group 154 can be effectively cooled, and the overall heat dissipation effect of the projector is better. However, the present invention is not limited thereto, and it can be adjusted according to actual requirements.

In addition, in the present embodiment, the lower cover 116 includes a third air inlet 116a. In a top view, the third air inlet 116a is located between the light source module 130 and the air outlet 110b and corresponds to the position of the upstream fin group 152. In the viewing angle of FIG. 1, the third air inlet 116a of the lower cover 116 is shielded corresponding to the upstream fin group 152, and thus is indicated by a broken line, and the third air inlet 116a may be a plurality of slits arranged in parallel to each other or a single opening, but the present invention is not limited thereto, as long as an opening corresponding to the upstream fin group 152 is provided on the lower cover 116. In this way, the third airflow A3 flows into the casing 110 from the third air inlet 116a in a Z-axis direction, and the heat of the upstream fin group 152 is further dissipated by the third airflow A3 flowing in from the third air inlet 116a, so that the heat flows out of the air outlet 110b along with the third airflow A3. Since the third air inlet 116a corresponds to the position of the upstream fin group 152, the efficiency of heat exchange between the third airflow A3 and the upstream fin group 152 is good. In this way, the arrangement of the third air inlet 116a can further improve the heat dissipation effect. However, the present invention is not limited thereto, and it can be adjusted according to requirements.

In conclusion, the projector of the present invention includes a casing, a projection lens module and a light emitting module, wherein the projection lens module is disposed in the casing and adjacent to a first air inlet of the casing, and the light emitting module is disposed in the casing and adjacent to an air outlet of the casing. In this way, a first airflow flows into the casing from the first air inlet to sequentially dissipate heat from the projection lens module and the light emitting module. Further, a rear cover of the casing includes a second air inlet, and the second air inlet corresponds to the light emitting module. In this way, a second airflow flows into the casing from the second air inlet to dissipate heat from the light emitting module. Thus, in addition to introducing the first airflow through the first air inlet, the second airflow is further introduced for a light emitting element of the light emitting module as a main heat source through the second air inlet to improve the heat dissipation effect of the light emitting module, so as to avoid impact on the heat dissipation effect of the light emitting module caused by accumulation of heat in the casing. In addition, the projector may also use a fan, a fin group, a heat dissipation base and/or a heat tube to improve the heat dissipation effect according to requirements. Accordingly, the projector of the present invention has a good heat dissipation effect and imaging quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations can be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which can allow a searcher to quickly ascertain the subject matter of the technical disclosure of any patent issued from this disclosure. It is submitted with the understanding that it can not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, comprising a casing, a projection lens module and a light emitting module, wherein
   the casing comprises a first air inlet and an air outlet;
   the projection lens module is disposed in the casing and adjacent to the first air inlet; and
   the light emitting module is disposed in the casing;
   wherein the casing comprises a rear cover, the rear cover comprises a second air inlet, and the second air inlet corresponds to the light emitting module;
   wherein the first air inlet is configured to allow a first airflow to flow into the casing from the first air inlet to dissipate heat from the projection lens module and the light emitting module, and then to flow out of the air outlet, and the second air inlet is configured to allow a second airflow to flow into the casing from the second air inlet to dissipate heat from the light emitting module, and then to flow out of the air outlet; and
   wherein the second air inlet is located at a rear end of the light emitting module, the air outlet is located at a side end of the light emitting module, and the light emitting module is located between the second air inlet and the air outlet on a flow path of the second airflow.

2. The projector according to claim 1, wherein the light emitting module comprises a light emitting element, and an angle between an optical axis of the light emitting element and a central normal of the second air inlet ranges from 0 to 45 degrees.

3. The projector according to claim 1, wherein the light emitting module comprises a light emitting element, and an angle between an optical axis of the light emitting element and a central normal of the second air inlet ranges from 0 to 5 degrees.

4. The projector according to claim 1, wherein an angle between the central normal of the second air inlet and a central normal of the air outlet ranges from 85 to 95 degrees.

5. The projector according to claim 1, wherein the first air inlet and the air outlet are correspondingly disposed on two opposite sides of the casing, and the projection lens module and the light emitting module are located between the first air inlet and the air outlet on a flow path of the first airflow.

6. The projector according to claim 1, wherein the distance between the first air inlet and the air outlet is greater than the distance between the second air inlet and the air outlet.

7. The projector according to claim 1, wherein the distance between the projection lens module and the first air inlet is less than the distance between the light emitting module and the air outlet.

8. The projector according to claim 1, wherein the casing further comprises a lower cover, the lower cover comprises a third air inlet, and the third air inlet is located between the light emitting module and the air outlet, and corresponds to the at least one fin group.

9. A projector, comprising a casing, a projection lens module and a light emitting module, wherein
the casing comprises a first air inlet and an air outlet;
the projection lens module is disposed in the casing and adjacent to the first air inlet; and
the light emitting module is disposed in the casing;
wherein the casing comprises a rear cover, the rear cover comprises a second air inlet, and the second air inlet corresponds to the light emitting module;
wherein the first air inlet is configured to allow a first airflow to flow into the casing from the first air inlet to dissipate heat from the projection lens module and the light emitting module, and then to flow out of the air outlet, and the second air inlet is configured to allow a second airflow to flow into the casing from the second air inlet to dissipate heat from the light emitting module, and then to flow out of the air outlet; and
wherein the projector further comprises:
  at least one fan, disposed in the casing and located between the light emitting module and the air outlet to draw the first airflow and the second airflow flowing into the casing from the first air inlet and the second air inlet to the air outlet; and
  at least one fin group, disposed in the casing and located between the light emitting module and the air outlet, such that the first airflow and the second airflow drawn by the fan flow to the air outlet through the at least one fin group.

10. The projector according to claim 9, wherein the at least one fin group comprises an upstream fin group disposed between the light emitting module and the fan.

11. The projector according to claim 9, wherein the at least one fin group comprises a downstream fin group disposed between the fan and the air outlet.

12. The projector according to claim 9, wherein the at least one fin group comprises an upstream fin group and a downstream fin group, and the fan is disposed between the upstream fin group and the downstream fin group.

13. The projector according to claim 9, wherein there are a plurality of fans, the plurality of fans being arranged side by side between the light emitting module and the air outlet.

14. The projector according to claim 9, wherein an arrangement range of the at least one fin group corresponds to an arrangement range of the fan.

15. The projector according to claim 9, wherein the distance between an end of the second air inlet closest to the air outlet and the air outlet is greater than the distance between a side of the fan farthest from the air outlet and the air outlet.

16. The projector according to claim 9, wherein the distance between an end of the second air inlet closest to the air outlet and the air outlet is less than the distance between a side of the at least one fin group farthest from the air outlet and the air outlet.

17. The projector according to claim 9, further comprising:
  a heat dissipation base, connected to the light emitting module and located between the light emitting module and the second air inlet, wherein the heat dissipation base comprises a plurality of heat dissipation structures, the plurality of heat dissipation structures protruding toward the second inlet; and
  at least one heat tube, connecting the heat dissipation base and the at least one fin group.

* * * * *